Nov. 12, 1957     F. H. EILMANN     2,812,987
BEARING MOUNTING STRUCTURES
Filed Oct. 17, 1956
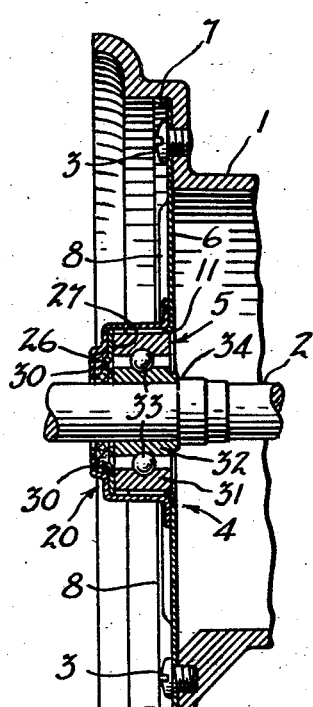
Fig. 1
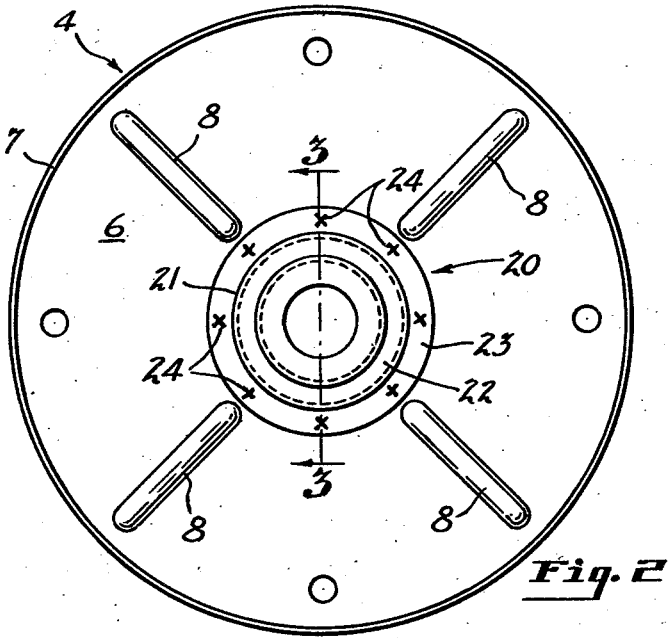
Fig. 2
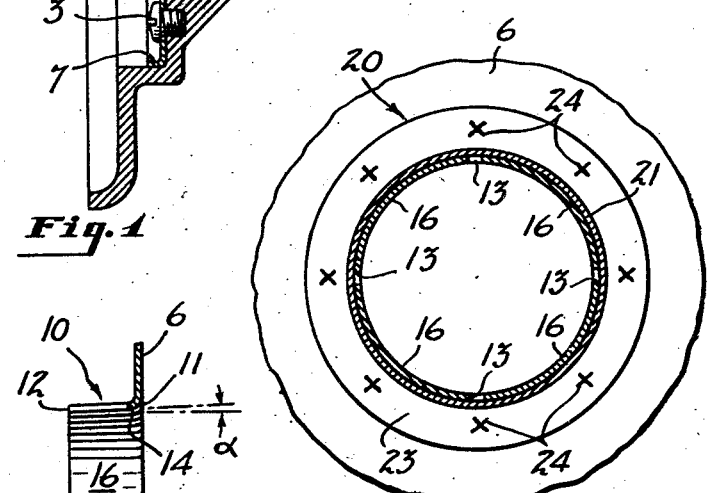
Fig. 4
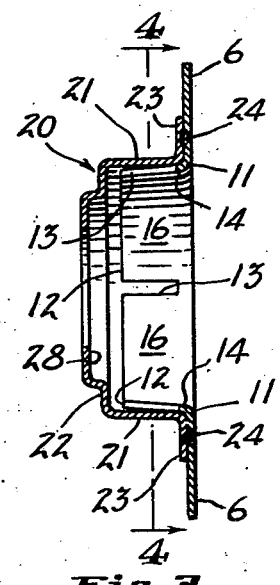
Fig. 3
Fig. 5
INVENTOR
*Fred H. Eilmann*
BY *Evaner Perne*
ATTORNEYS

United States Patent Office 2,812,987
Patented Nov. 12, 1957

2,812,987

BEARING MOUNTING STRUCTURES

Fred H. Eilmann, Rocky River, Ohio, assignor to The Scott & Fetzer Company, Cleveland, Ohio, a corporation of Ohio Application October 17, 1956, Serial No. 616,552

7 Claims. (Cl. 308—178)

This invention relates to mounting structures for bearings and particularly to mounting structures for small ball or roller bearings suitable for rotatably supporting small electric motor and fan shafts in such apparatus as domestic vacuum cleaners and the like.

One of the problems involved in the design of domestic vacuum cleaners and the like, which must be rugged to provide long life, yet must be light in weight for easy transportation to the place of use and easy movement in operation, is to achieve the strength and rigidity of mechanical parts necessary to meet the first requirement without resorting to massiveness which is incompatible with the second requirement. Also, since such devices are sold in a highly competitive market, another problem has been to meet both of the above requirements with structural parts and assemblies which can be manufactured efficiently at relatively low cost.

The foregoing problems have been particularly acute in the design of bearing mounting structures for motor shafts, fan shafts, and the like, which, at all times while the devices are in use, are subjected to wear and to various stresses tending to cause misalignment of moving parts, with consequent annoying vibration and premature mechanical failures.

The principal object of the present invention is to provide an improved mounting plate and bearing assembly for motor shafts or fan shafts of domestic vacuum cleaners, and for similar uses in other kinds of light machinery and appliances. More specifically, the objects of the invention are to provide such a bearing mounting structure which may be economically fabricated entirely from sheet metal by simple forming operations, which may be easily and quickly assembled, and which will rigidly support and positively position a ball bearing, roller bearing, or other anti-friction bearing so as to effectively maintain proper alignment of a motor shaft, fan shaft, or the like rotatably supported by the bearing.

The invention by which the foregoing objects are accomplished is characterized by an annular, sheet metal, bearing mounting disk having, about its inner periphery, a narrow, axially extending, integral flange, a plurality of tongue-like extensions of said flange circumferentially spaced about the free end of the flange, and a sheet metal cup having a bottom wall spaced from the ends of said extensions, a cylindrical side wall closely surrounding said extensions, and an outwardly extending lip flange secured to the mounting plate and welded or otherwise secured in abutting relationship thereto. A cylindrical bearing is pressed axially into this mounting structure so that it is surrounded, gripped, and supported at one end by the continuous flange of the mounting plate, is snugly and firmly embraced along its length by the tongue-like extensions of the continuous flange, which are in turn backed up by the surrounding cylindrical wall of the cup, and is restrained against further axial movement by engagement with the bottom wall of the cup.

The various parts referred to above and hereinafter more fully described are so formed and related that the bearing is rigidly supported in alignment with the axis of the structure so as to resist tilting or transverse movement of its own axis, is positively restrained against axial movement in either direction, and is frictionally gripped so as to be securely held in the mounting structure during its assembly with other parts of a machine to be associated therewith. These operational characteristics are achieved by means of a bearing mounting structure formed of two simple, sheet metal stampings welded or otherwise secured together in a mutually cooperating and mutually reinforcing relationship, thus also making such structure highly economical and simple to manufacture and assemble.

The foregoing and additional objects, characteristic features, and advantages of the invention will be more fully understood and appreciated from the following detailed description of a specific embodiment given for illustrative purposes, and from the accompanying drawing thereof in which:

Figure 1 is a fragmentary vertical section through a vacuum cleaner housing and through a bearing and bearing mounting structure embodying the present invention;

Fig. 2 is an end elevation of the bearing mounting structure of Fig. 1, viewed from the left of Fig. 1;

Fig. 3 is an enlarged, fragmentary vertical section of the bearing mounting structure of Fig. 2, taken as indicated by the line 3—3 in Fig. 2;

Fig. 4 is a fragmentary vertical section of the same bearing structure, taken as indicated by the line 4—4 in Fig. 3; and, Fig. 5 is a fragmentary vertical section similar to Fig. 3 but showing only one of the parts in Fig. 3.

Referring to the drawing, a housing 1 for enclosing a vacuum cleaner motor is fragmentarily shown with a shaft 2 extending therethrough for connection at one end to an electric motor and at its opposite end to a suction fan. Secured within the housing 1 by a plurality of screws 3 is a bearing and bearing mounting structure assembly, generally designated 4, constructed in accordance with the invention for mounting a bearing, generally designated 5.

The assembly 4 is built on and supported by an annular sheet metal disk 6. The periphery of the disk may be provided with an outer, integral, stiffening and positioning flange 7 engaging the housing 1. Radially extending stiffening ribs 8 are preferably formed in the disk 6 for resisting stresses tending to cup the disk in either axial direction. At its inner periphery, the disk 6 is provided with an integral bearing gripping flange, generally designated 10, that extends axially from one face of the disk. In order to provide maximum resistance to radially outward stress imposed by the bearing in any direction due to bearing loads, and in order to provide maximum resistance to elastic expansion of the flange 10 when the bearing 5 is pressed into the central opening of the disk, as hereinafter described, the flange 10 is preferably struck abruptly outwardly from the disk with a sharp bend 11 at the junction of the flange and disk. For example, the large or outer radius of this bend may be no greater than 2 to 2½ times the thickness of the sheet metal from which the disk is formed.

The gripping flange 10 extends to a free end 12 (Fig. 5) and is slotted at 13 in an axial direction from its free end toward, but short of, the adjacent side of the disk 6 so as to leave a narrow, circumferentially continuous flange portion 14 adjacent the disk. There are a plurality of slots 13 in the flange, preferably at least four as shown, which are uniformly spaced circumferentially about the flange 10 so as to define a corresponding number of axially extending tongues 16 of cylindrical contour in transverse section. Though such contour of the tongues 16 provides substantial resistance to radially outward flexure of the tongues, their width is limited by the spacing of the slots 13 so that they are capable of such flexure to the small degree desired, as hereafter explained. The tongues 16 converge slightly in the direction of their free ends, preferably making an angle $\alpha$ with the axis of the disk, which is about 2°, e. g. 1½ to 2½°.

The tongues 16 are surrounded by a sheet metal cup, generally designated 20, having a cylindrical side wall 21, a transverse bottom wall 22, and a flange 23 extending radially outwardly from the lip or rim of the cup. The side wall 21 of the cup snugly surrounds the continuous flange portion 14 of the disk 6 of the lip or open end of the cup, and extends in the direction of and slightly beyond the free ends 12 of the tongues 16. Over the major portion of their lengths, the converging tongues 16 are slightly spaced from the cylindrical side wall 21 of the cup (shown to an exaggerated degree in Fig. 3) to permit radially outward flexure of the tongues to the small degree referred to above. Such flexure of the tongues is positively limited by the surrounding side wall 21 of the cup.

The lip flange 23 of the cup 20 is secured in abutting relationship with the adjacent face of the disk 6 entirely about their common axis, as by an array of spot welds indicated at 24 in Figs. 2 and 3. The juncture between the lip flange 23 and the side wall 21 of the cup is preferably made as an even more abrupt or sharp bend than the juncture between the disk 6 and the continuous flange portion 14. Thus, the metal of the cup parts and the metal of the disk parts in this region may be in surface-to-surface contact with each other at the bends therein, as well as over the entire surface of the lip flange 23 of the cup and over substantially the entire surface of the short circumferentially continuous flange portion 14 of the disk structure. This close conformance of the cup and disk structures in the region 11 causes these parts to cooperate in a mutually supporting and reinforcing relationship to provide a desired high degree of rigidity of the assembly in this region.

The bottom wall 22 of the cup 20 serves as a stop to positively limit inward axial movement of a bearing and, in the illustrated embodiment, it also serves to position a grease retaining ring 26 and a metal washer 27 (Fig. 1). For this latter purpose, the bottom wall 22 is provided with a circular recess 28 to receive the grease retaining ring 26, which may be made of felt or other suitable soft material initially thicker than the depth of the recess 28. About the recess 28, the bottom wall 22 is axially spaced from the ends 12 of the tongues 16 sufficiently to receive the metal washer 26 therebetween (Fig. 1), against which washer the end of the bearing 5 may be seated. This washer is preferably provided with struck-out prongs 30 (Fig. 1) which extend into the grease retainer 26 to hold the latter against rotation.

The bottom wall 22, grease retainer 26, and washer 27 are all centrally apertured to receive the motor and fan shaft 2. However, as will be apparent, essentially the same bearing mounting structure 4 is also adapted for mounting an end bearing or the like at the end of a shaft, in which case, the central aperture in the bottom wall 22 is unnecessary, and the grease retainer 26 and washer 27 may be omitted entirely or modified in any desired manner to cooperate as desired with whatever type of end bearing may be employed.

The bearing 4 may be a conventional ball bearing comprising an outer race 31, an inner race 32, and balls 33 rotatably disposed between the races. The inner bearing race 32 may be pressed on the shaft 2 and positioned thereon by a shoulder 34.

In assembling the shaft 2 and bearing 5 in the mounting structure 4, the grease retainer 26 and washer 27 are first placed in position as shown. One end of the shaft 2 is then projected to the left through the assembly, as viewed in Fig. 1, and pressure is applied axially against either the opposite end of the shaft or the outer race 31 of the bearing to force the bearing into the assembly as shown. In order to provide the desired tight fit of the bearing in the mounting structure, the outer diameter of the outer race 31 of the bearing is selected to provide a "force fit" thereof in the continuous flange portion 14 of the disk structure. For an outer race of, say 1⅛ inches in diameter, the minimum inside diameter of the continuous flange portion 14 may, for example, be only about 0.001 to 0.005 inch greater than the diameter of the outer race. The resulting tight fit of the bearing 5 in the continuous flange portion 14 occurs practically in the plane of the disk 6. Thus, the disk 6 reinforces the continuous flange portion 14 so as to rigidify and assist it in resisting expansion and distortion, thereby maintaining more accurate alignment of the bearing 5.

The above described slight convergence of the tongues 16 provides a yielding resistance to inward movement of the bearing 5. As this movement takes place against such resistance, the tongues 16 flex radially outwardly into engagement over their entire length with the cylindrical wall 21 of the cup 20. The outward flexing of the tongues 16 is positively stopped by the cylindrical wall 21 when the tongues have been flexed to the point where their inner surfaces define a cylinder. As a result, essentially the same tight, gripping fit of the outer race 31 is provided substantially continuously about its periphery and over its entire length.

Inward movement of the bearing 5 is continued until the outer race 31 thereof bears firmly against the washer 27. This tends to prevent rotation of the washer by clamping it between the outer race 31 of the bearing and the bottom wall 22 of the cup 20. It also positively locates the bearing in an axial direction. Pressure of the washer 27 against the grease retainer 26 compresses the retainer so that it sealingly surrounds the shaft 2. At the same time, the prongs 30 of the washer 27 penetrate the retainer 26 and prevent it from being rotated by the shaft 2.

As a result of the mutually cooperating and reinforcing relationships of the parts of the device described herein, a bearing support may be formed from relatively light and very simple sheet metal stampings, yet provided with a degree of rigidity, ruggedness, and reliability in service heretofore difficult to obtain even with heavy castings and forgings. As should be apparent from the foregoing description, the device also combines an economy in manufacturing and assembling the parts which is not possible when heavier, cast, forged, and/or machined parts are required, or where more complex arrangements of parts are employed. These advantages of the invention, moreover, are equally obtainable whether the invention is used in vacuum cleaners, to which particular reference has been made herein for illustrative purposes, or in any of a wide variety of other types of machinery.

It will be apparent that many of the details of the particular structure disclosed herein may be modified in various ways while still employing essentially the same or equivalent mechanical principles. Accordingly, the invention is intended to be limited to such details only as required by the terms of the appended claims.

What is claimed is:

1. A bearing mounting structure comprising an annular sheet metal disk having an integral bearing gripping flange extending generally axially from one side thereof about the opening therein and terminating in a free end, said flange being slotted in an axial direction from its free end toward, but short of, the plane of said one side of the disk so as to leave a narrow, circumferentially continuous, flange portion adjacent the disk for embracing the periphery of a bearing, there being a plurality of such slots spaced circumferentially about said flange so as to define spaced, axially extending tongues of cylindrical contour in transverse section which are capable of elastic radial flexure, said tongues normally converging in the direction of their free ends for radially outward flexure when interiorly engaged by a bearing moved axially through the opening in said disk in the direction of the free ends of the tongues, and a sheet metal reinforcing and bearing positioning cup having a cylindrical side wall snugly surrounding said continuous flange portion and extending in the direction of and beyond the free ends of said tongues for limiting outward flexure thereof, said cup having a transverse bottom wall beyond the free ends of said tongues for limiting axial movement of a bearing as aforesaid and having a central aperture therethrough for a shaft rotatable in said bearing, the side wall of said cup having an integral, outwardly directed flange secured to said disk in abutting relationship therewith for stiffening the disk and said continuous flange portion.

2. A bearing mounting structure according to claim 1 in which said bottom wall of said cup has an internal, annular recess about the central aperture therein for receiving a grease retaining ring.

3. A bearing mounting structure according to claim 1 in which said normally converging tongues are disposed at an angle of about 2° to the axis of the disk.

4. A bearing mounting structure according to claim 1 in which the outwardly directed flange of the cup is welded to the disk.

5. A bearing and bearing mounting structure assembly comprising an annular sheet metal disk having an integral bearing gripping flange extending generally axially from one side thereof about the opening therein and terminating in a free end, said flange being slotted in an axial direction from its free end toward, but short of, the plane of said one side of the disk so as to leave a narrow, circumferentially continuous, flange portion adjacent the disk for embracing the periphery of a bearing, there being a plurality of such slots spaced circumferentially about said flange so as to define spaced, axially extending tongues of cylindrical contour in transverse section which are capable of elastic radial flexure, said tongues normally converging in the direction of their free ends for radially outward flexure when interiorly engaged by a bearing moved axially through the opening in said disk in the direction of the free ends of the tongues, and a sheet metal reinforcing and bearing positioning cup having a cylindrical side wall snugly surrounding said continuous flange portion and extending in the direction of and beyond the free ends of said tongues for limiting outward flexure thereof, said cup having a transverse bottom wall beyond the free ends of said tongues for limiting axial movement of a bearing as aforesaid and having a central aperture therethrough for a shaft rotatable in said bearing, the side wall of said cup having an integral, outwardly directed flange secured to said disk in abutting relationship therewith for stiffening the disk and said continuous flange portion, said bottom wall of said cup having an internal, annular recess about the central aperture therein, a grease retaining ring of soft material seated concentrically in said recess, an annular metal washer concentrically disposed in said cup in compressing engagement with said retaining ring and in engagement with the end wall of the cup outwardly of the recess therein, and a cylindrical bearing disposed in the aforesaid structure with one end thereof engaging said washer, with the body of the bearing grippingly engaged by said tongues, with the tongues flexed outwardly in engagement with the side wall of said cup, and with the opposite end of the bearing snugly embraced by said continuous flange portion.

6. A bearing mounting structure comprising an annular sheet metal disk having an integral bearing gripping flange extending generally axially from one side thereof about the opening therein and terminating in a free end, said flange being slotted in an axial direction from its free end toward, but short of, the plane of said one side of the disk so as to leave a narrow, circumferentially continuous, flange portion adjacent the disk for embracing the periphery of a bearing, there being a plurality of such slots spaced circumferentially about said flange so as to define spaced, axially extending tongues of cylindrical contour in transverse section which are capable of elastic radial flexure, said tongues normally converging in the direction of their free ends for radially outward flexure when interiorly engaged by a bearing moved axially through the opening in said disk in the direction of the free ends of the tongues, and a sheet metal reinforcing and bearing positioning cup having a cylindrical side wall snugly surrounding said continuous flange portion and extending in the direction of and beyond the free ends of said tongues for limiting outward flexure thereof, said cup having a transverse bottom wall beyond the free ends of said tongues for limiting axial movement of a bearing as aforesaid, the side wall of said cup having an integral, outwardly directed flange secured to said disk in abutting relationship therewith for stiffening the disk and said continuous flange portion.

7. A bearing and bearing mounting structure assembly comprising an annular sheet metal disk having an integral bearing gripping flange extending generally axially from one side thereof about the opening therein and terminating in a free end, said flange being slotted in an axial direction from its free end toward, but short of, the plane of said one side of the disk so as to leave a narrow, circumferentially continuous, flange portion adjacent the disk for embracing the periphery of a bearing, there being a plurality of such slots spaced circumferentially about said flange so as to define spaced, axially extending tongues of cylindrical contour in transverse section which are capable of elastic radial flexure, said tongues normally converging in the direction of their free ends for radially outward flexure when interiorly engaged by a bearing moved axially through the opening in said disk in the direction of the free ends of the tongues, and a sheet metal reinforcing and bearing positioning cup having a cylindrical side wall snugly surrounding said continuous flange portion and extending in the direction of and beyond the free ends of said tongues for limiting outward flexure thereof, said cup having a transverse bottom wall beyond the free ends of said tongues for limiting axial movement of a bearing as aforesaid, and a cylindrical bearing disposed in the aforesaid structure with one end thereof engaging the interior of the bottom wall of the cup, with the body of the bearing grippingly engaged by said tongues, with the tongues flexed outwardly in engagement with the side wall of the cup, and with the opposite end of the bearing snugly embraced by said continuous flange portion.

References Cited in the file of this patent

UNITED STATES PATENTS

| | | |
|---|---|---|
| 2,506,404 | Woodfield | May 2, 1950 |
| 2,521,638 | Lamm | Sept. 5, 1950 |
| 2,534,142 | Morton | Dec. 12, 1950 |